Oct. 5, 1965                R. A. LESTER ETAL                3,209,591
                              ACOUSTIC FLOW METER
Filed Aug. 17, 1962                                        2 Sheets-Sheet 1

PRIOR ART

WITNESSES

INVENTORS
Robert A. Lester and
John H. Thompson
BY
ATTORNEY

United States Patent Office 3,209,591
Patented Oct. 5, 1965

3,209,591
ACOUSTIC FLOW METER
Robert A. Lester, Monroeville, and John H. Thompson, Penn Hills, Pa., assignors to Westinghouse Electric Corporation, East Pittsburgh, Pa., a corporation of Pennsylvania
Filed Aug. 17, 1962, Ser. No. 217,589
7 Claims. (Cl. 73—181)

This invention relates in general, to velocity measuring apparatus, and in particular to apparatus for measuring the relative velocity of a body with respect to a fluid medium.

Apparatus for determining the velocity of a fluid or the velocity of a body immersed in that fluid, include acoustic flow meters which utilize the propagation of acoustic energy in the fluid medium to obtain an indication of the relative velocity. Many types of these acoustic flow meters include two probes mounted on a body traveling through the fluid medium, with each probe comprising two transducers, one for transmitting acoustic signals, and the other for receiving acoustic signals, to and from a respective pair of transducers on the other probe. The probes are generally mounted on the body in a direction relative to the travel of the body through a fluid medium such that the acoustic signal produced by one transducer is retarded by movement of the body through the fluid medium, and the acoustic signal produced by the transducer on the opposite probe is aided by movement of the body through the fluid medium. If the acoustic path from one transmitting transducer to its respective receiving transducer is equal in length to the acoustic path of the other transmitting and receiving transducers, the velocity of the body traveling through the fluid medium may be obtained by a comparison of the phase difference of the signals produced by the receiving transducers. The use of four transducers in such systems requires additional cabling and increases problems of "crosstalk" between transducers. In addition, when two acoustic signal paths are utilized, one path may be through an inhomogeneous layer or patch of fluid medium thus causing the acoustic path to bend. Since the velocity of the body in the fluid medium is proportional to a phase difference of the signals produced by the receiving transducers only if the acoustic paths are equal, the bending of one acoustic path in an inhomogeneous portion of fluid medium will cause erroneous readings of velocity. Many acoustic flow meters operating at a single frequency are severely limited in the choice of transducer probe spacing. To calibrate many acoustic flow meters, it is necessary to decrease the velocity of the body to zero, after which, adjustments are made so that an output signal indicates zero phase difference between acoustic signals.

It is, therefore, an object of the present invention to provide an acoustic flow meter which will give a correct indication of the velocity of a body traveling through a fluid medium regardless of inhomogeneous portions in the fluid medium.

It is another object to provide an acoustic flow meter which may be calibrated without being removed from the flow.

It is another object to provide an acoustic flow meter which operates on a modulated signal frequency input signal.

It is still another object to provide an acoustic flow meter which will give a continuous indication of velocity.

Briefly, in accordance with the objects of the present invention, there is provided input signal means which in its preferred form includes a source of carrier frequency, means for modulating the carrier frequency, and means for providing an on and an off period of transmission for the input signal means. First and second transducer means are provided, and are responsive to the input signal means during an on period of transmission to provide first and second acoustic signals which travel to and from one another through the fluid medium to cause an output signal from each transducer means. In order to produce identical paths for the acoustic signals, each transducer means may comprise a transmitting transducer and a receiving transducer on each probe with each transducer having the same acoustical center and identical beam patterns. Alternatively, the first and second transducer means may comprise single transducers. Receiver means having a demodulation region and a saturation region of operation are provided to receive the output signals from each of the transducer means during off periods of transmission, and the modulated input signal during on periods of transmission and is biased such that operation is in the saturation region upon application of the input signal to provide a substantially noise, or hash output signal, and operation is in the demodulation region upon application of the output signals to produce first and second demodulated signals. These first and second demodulated signals are then fed into a comparison means, the output of which will give an indication of the velocity of the body traveling through the fluid medium.

In order to zero the acoustic flow meter while the body is traveling in the fluid medium, switching means are provided such that the output from only one transducer means is fed to the receiver means to give third and fourth demodulated signals which signals should be in phase if the apparatus is properly adjusted. Phase shifting means may be provided to so coincide the third and fourth demodulated signals.

The stated and further objects of the present invention will become apparent upon a reading of the following specification taken in conjunction with the drawings in which.

Figure 1:
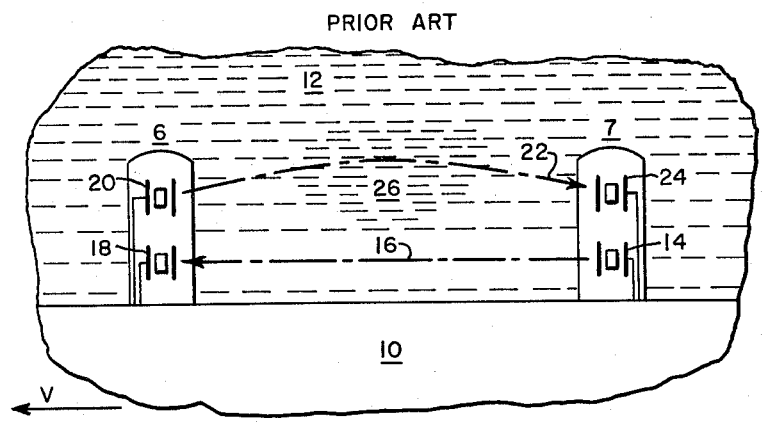
FIGURE 1 is a schematic drawing of acoustic beam paths produced by two sets of transducers, with one acoustic path passing through an inhomogeneous portion of fluid.

Referring now to FIG. 1, there is shown two probes 6 and 7 mounted upon body 10 traveling through a fluid medium 12. The invention herein is particularly adapted to measure the velocity of a surface or undersurface craft traveling on or in the water, and as such body 10 may be a submarine. Probe 7 includes transducer 14 operable to provide an acoustic signal along path 16 to receiver transducer 18. Similarly, transducer 20 of probe 6 is operable to produce an acoustic beam which is received by transducer 24 of probe 7. It may be seen that with the presence of an inhomogeneous patch of water 26 produced for example by a salinity difference in that particular area, the acoustic signal received by transducer 24 of probe 7 follows the acoustic path 22 from transducer 20 of probe 6. Since the acoustic path 22 is greater than the acoustic path 16, the velocity indication obtained will be in error.

To eliminate the undesirable effects inherent in a four transducer, two acoustic beam path system, the acoustic signals transmitted between probes may be made to follow identical paths such that if one path is increased due to the presence of inhomogeneous portions in the water, the other acoustic path will be increased by an identical amount. To this end, reference is now made to FIG. 2. Input signal means are provided and include a transmitter 32 which is operable to provide a carrier frequency which is modulated by a modulation frequency from oscillator 34. Gating circuit 36 is provided to gate the input signal to obtain on and off periods of transmission. The output signal thus obtained from transmitter 32 is the modulated input, or carrier signal, to transducer means 28 and 30, in addition to providing an input signal for receiver means 40 and 41 through first and second resistance means 37 and 38 which aid in matching transmitter 32 to transducer means 28 and 30 for a purpose to be hereinafter described. The transducer means 28 and 30 are each adapted to transmit and receive acoustic signals to and from one another in the fluid medium 12, and in their simplest form may each be a single transducer. Alternatively, each transducer means 28 and 30 may comprise two transducers having the same acoustical center which produce identical beam patterns. Switching means 42 is provided such that the circuit may give an indication of velocity when the switch is in a first position, and when the switch is in a second, or calibrate position, the apparatus may be "zeroed" even though there is travel through the fluid medium. As will be explained with reference to FIG. 3, receiver means 40 and 41 are operable to produce first and second demodulated signals during an off period of transmission, the phase difference between said signals being proportional to the velocity. During calibration, receiver means 40 and 41 are operable to produce, during an off period of transmission, third and fourth demodulated signals which should be in phase, and may be put in phase by phase shifting means which may be located in receiver 41, for example. Comparison means are provided to compare the demodulated signals from receiver means 40 and 41 and include phase meter 46 which produces an output proportional to the relative velocity. Means such as memory device 48 is provided to sample the output from the phase meter 46 and which sampling is governed by a gating pulse from the gating circuit 36, to give a continuous indication of velocity at the output G.

Figure 2:
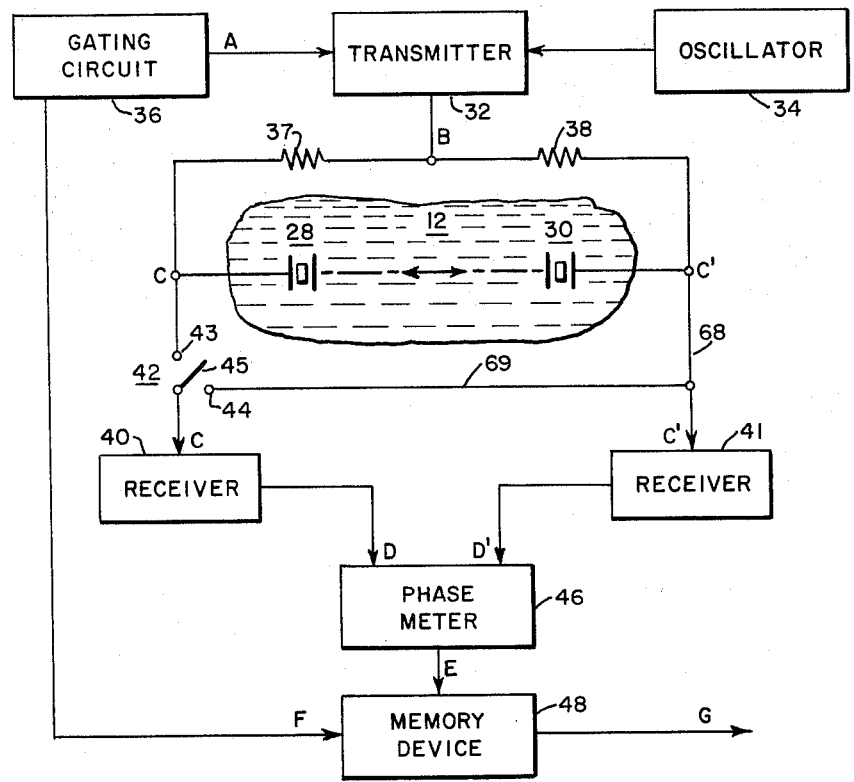
FIG. 2 is a schematic drawing of a preferred embodiment of the present invention; and, FIG. 3 shows waveforms to aid in an understanding of the operation of the circuit of FIG. 2.
Figure 3:
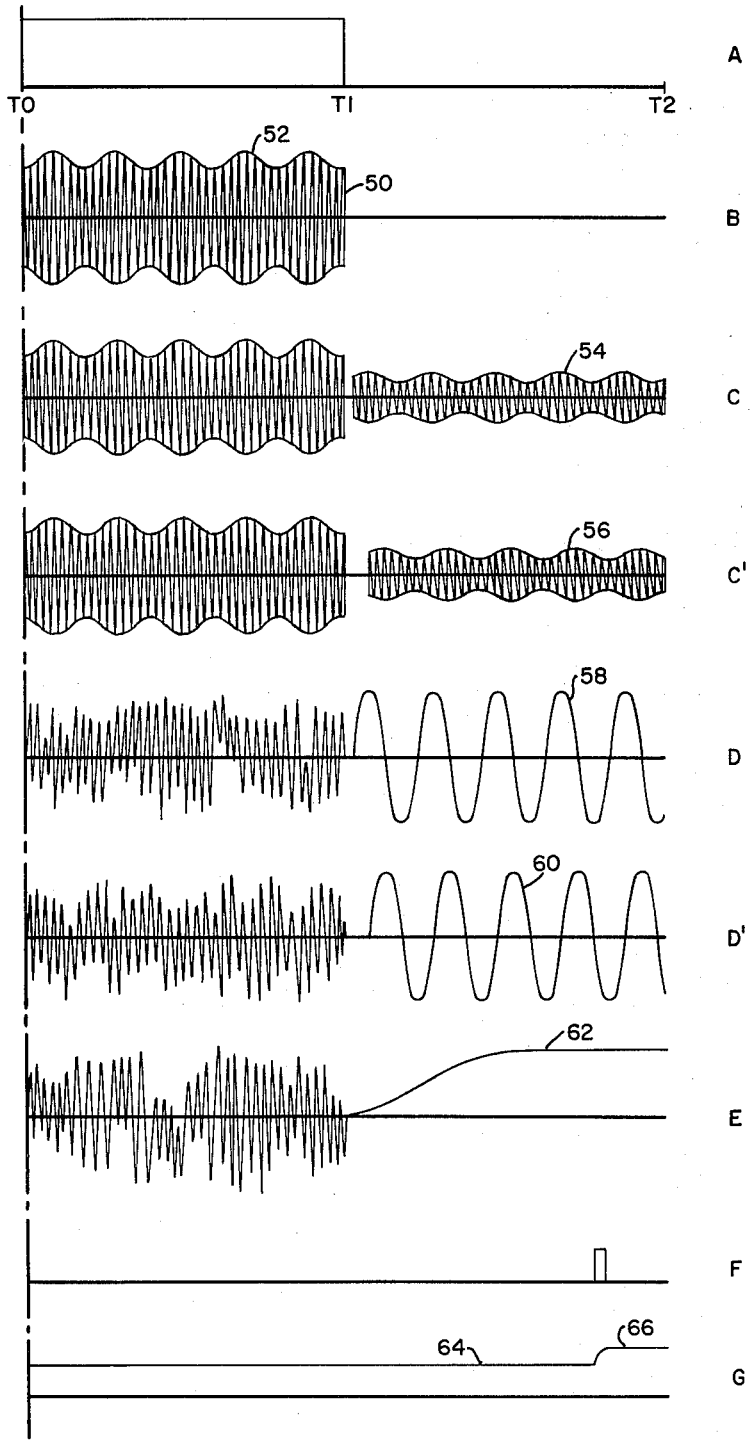

Referring now to FIG. 3, there is shown a plurality of waveforms appearing at various points in the circuit of FIG. 2. In order to provide for on and off periods of transmission, gating circuit 36 produces a pulse waveform such as shown in curve A for producing an on period of transmission from T0 to T1 and an off period of transmission from T1 to T2. Curve B appearing at point B in FIG. 2 shows the modulated carrier input signal and comprises a carrier frequency 50 produced by transmitter 32 and a modulation frequency 52 produced by oscillator 34. During the on period of transmission from T0 to T1 and with arm 45 of switching means in a first mode of operation contacting terminal 43, the modulated input carrier signal of curve B is applied through resistors 37 and 38 to transducer means 28 and 30 in addition to receivers 40 and 41, as represented by curves C and C' from T0 to T1. The application of the waveform of curve C to transducer means 28 causes an acoustic signal to be propagated through the fluid medium 12 toward transducer means 30. Similarly the application of the waveform of C' to transducer means 30 causes an acoustic signal to be propagated through the fluid medium 12 toward the transducer means 28. In its simplest form, transducer means 28 and 30 may be single transducers and the acoustic signals thus produced follow identical paths in opposite directions with one acoustic signal, for example the signal from transducer 30 being aided by velocity in the fluid medium and the other acoustic signal being retarded by velocity in the fluid medium. During this same period of time, T0 to T1, the waveforms of curve C and C' are applied respectively to receivers 40 and 41. These receivers 40 and 41 are biased such that upon the application of the waveforms C and C', having a first power level, the receivers will be overdriven, or swamped, and no demodulated signal will be produced in their outputs, which condition appears as curves D and D' showing a substantially noise, or hash, output during the on period of transmission T0 to T1. The two noise signals D and D' applied to phase meter 46 produces a substantially noise output shown in curve E from the period T0 to T1. The spacing between transducers 28 and 30, and the duration of the gating pulse of curve A, may be chosen such that the acoustic energy produced by transducer 28 will reach transducer 30 at approximately the beginning of the off period of transmissions, and the same is true of the acoustic signal produced by transducer 30 and directed toward transducer 28. The reception times will however depend upon any relative velocity. During this off period of transmission, transducer 28 receives the acoustic signal produced by transducer 30 and will provide a first output signal as shown in curve C from T1 and T2 having a second power level substantially lower than the power level of the signal from T0 to T1. Similarly, transducer 30 will provide a second output signal, produced by the acoustic energy propagated by transducer 28, which also has a second power level substantially lower than the power level of the signal from the period T0 to T1. Since one of the signals was aided by velocity through the medium, and the other acoustic signal was retarded by velocity through the medium, the output signals produced by transducers 28 and 30 as seen in curve C and C' from the periods T1 and T2 will differ in phase by an amount proportional to the velocity in the fluid medium. During the off period of transmission, receivers 40 and 41 receive respectively the waveforms 54 and 56 having a low enough power level such that the receiver will properly demodulate the signals to provide respectively, first and second demodulated signals 58 and 60 also differing in phase by an amount proportional to the velocity in the fluid. These demodulated signals 58 and 60 are fed into a phase meter 46 which after a few cycles of comparison reaches a steady state value as shown by the plateau 62 of curve E from the period T1 to T2. In order to provide a continuous indication of velocity, or changes in velocity, the output of the phase meter 46 is fed to a memory device 48 which samples the output of the phase meter periodically. This sampling may be accomplished by a pulse from the gating circuit 36 applied to the memory device 48 as shown in curve F. The output of the memory device 48 as shown in G shows an increase in velocity as indicated by plateau 64 which changed to a new reading 66 after the output of the phase meter 46 was sampled by gating its output voltage to the memory device 48. It is to be noted that the waveforms shown in FIG. 3 are made by way of example and that various types of modulation may be utilized with various frequencies and gating times, depending upon the application of the circuit of FIG. 2.

When the relative velocity between the body 10 and the fluid medium 12 is zero, the demodulated signals 58 and 60 of FIG. 3 should be in phase. One method of performing this calibration is to reduce the velocity of the body 10 to zero, which is inconvenient, time consuming, and not necessarily accurate since the fluid medium 12 may have a velocity relative to the body 10. The circuit of FIG. 2 with the switching means 42 affords a novel method of calibration regardless of the relative velocity between the body 10 and fluid medium 12. When it is desired to perform a calibration, arm 45 of switching means 42 may be placed in a second mode of operation such that contact is made with the terminal 44. During the on period of transmission, transducer 28 will produce an acoustic signal directed toward transducer 30, and transducer 30 will produce an acoustic signal directed toward transducer 28. It may be seen that when the switching means 42 is in its second mode of operation, any output signal produced by transducer 28 will not be fed into receiver 40. The acoustic signal produced by transducer 28 causes transducer 30 to provide an output signal during the off period of transmission which is applied via the conductors 68 and 69 to receivers 41 and 40, respectively. Since receivers 41 and 40 both receive the identical signal, their output should be identical in phase, but often due to unsymmetrical equipment, there might be a slight phase shift produced. To compensate for this and to bring the output signals into coincidence, phase shifting means may be provided in the circuit, for example in the receivers or phase meter.

The output impedance of transmitter 32 is chosen to have a relatively low value. Resistors 37 and 38, which may be in the order of 100 ohms each, operating in conjunction with the low output impedance of transmitter 32, serve to isolate transducer means 28 and 30 from each other. In addition, resistors 37 and 38 insure that the transducers see substantially the same impedance when switching means 42 is in the first mode of operation or the second mode of operation, thus eliminating time delays which would give erroneous velocity readings.

Transducers 28 and 30 may be so positioned in the fluid medium so as to produce acoustic beams, one in the direction of the velocity and the other in the opposite direction to the velocity, it is to be understood that the transducers may be positioned so as to produce acoustic beams which are at an angle to the velocity direction to produce output signals which may then be resolved to obtain a forward component of velocity. A typical circuit such as the circuit shown in FIG. 2 having a transducer spacing of ten feet may operate with a carrier frequency produced by transmitter 32 of one megacycle per second and a modulating frequency produced by oscillator 34 of twenty kilocycles per second. The on and off period of transmission may be two milliseconds respectively which would allow for a comparison of approximately 40 cycles of the demodulated signals. With an on and off period of transmission of two milliseconds each, the memory device 48 would sample the output of the phase meter 46 250 times per second. It is to be understood, however, that the modulation and the various transducer spacing and frequencies utilized may be altered to fit specific applications.

Although the present invention has been described with a certain degree of particularly, it should be understood that the present disclosure has been made by way of example and that numerous changes in the details of construction and the combination and arrangement of parts may be resorted to without departing from the scope and spirit of the invention.

What is claimed is:

1. Apparatus for determining the relative velocity between a body and a fluid medium, comprising in combination: input signal means for providing a modulated carrier input signal having alternating on and off periods of transmission; first and second transducer means cooperating with said body and disposed in said fluid medium, with each of said transducer means responsive to said input signal for providing first and second acoustic signals along identical paths, said first acoustic signal being aided by said relative velocity to produce a first output signal from said second transducer means, and said second acoustic signal being retarded by said relative velocity to produce a second output signal from said first transducer means, said first and second output signals having a lower power level than said input signal; receiver means having a demodulation region and a saturation region of operation for receiving said input signal and said first and second output signals, said receiver means biased such that during on periods of transmission said receiver means is responsive to said input signal and said first and second output signals, said receiver demodulation occurs, said receiver means additionally responsive during off periods of transmission to said lower power level first and second output signals such that operation is in said demodulation region to provide first and second demodulated signals; and phase comparison means for comparing the relative phase of said first and second demodulated signals whereby said relative velocity may be determined.

2. Apparatus for determining the relative velocity between a body and a fluid medium, comprising in combination: input signal means for providing a modulated carrier frequency input signal, said means including gating means for obtaining on and off periods of transmission of said input signal; a pair of transducers cooperating with said body and disposed in said fluid medium for transmitting acoustic signals to and from one another, said acoustic signals being propagated upon application of said input signal to said transducers during an on period of transmission, said transducers operable to provide respectively, first and second output signals upon receipt of said acoustic signals, said output signals occurring during an off period of transmission, and having a lower power level than said input signal; first receiver means connected through first resistance means to said input signal means and one transducer of said pair; second receiver means connected through second resistance means to said input signal means and the other transducer of said pair; said first and second receiver means being biased such that they are overdriven upon receipt of said input signal and will produce first and second demodulated signals only upon receipt of said lower power level first and second output signals; and means for comparing the phase difference of said first and second demodulated signals.

3. An acoustic flow meter for determining the relative velocity between a body and a fluid medium, comprising in combination: input signal means for providing a modulated carrier frequency input signal, said means including gating means for obtaining on and off periods of transmission of said input signal; a pair of transducers cooperating with said body and disposed in said fluid medium for transmitting acoustic signals to and from one another, said acoustic signals being propagated through said fluid medium upon application of said input signal to said transducers during an on period of transmission, said transducers operable to provide respectively, first and second output signals upon receipt of said acoustic signals, said output signals occurring substantially during an off period of transmission, and having a lower power level than said input signal; first receiver means connected to said input signal means and one transducer of said pair; second receiver means connected to said input signal means and the other transducer of said pair; said first and second receiver means being biased such that they are overdriven upon receipt of said input signal and will produce first and second demodulated signals only upon receipt of said lower power level first and second output signals, said first and second demodulated signals having a phase difference proportional to any relative velocity between said fluid medium and said body; a phasemeter responsive to said first and second demodulated signals for providing a D.C. voltage indicative of said phase difference; and a memory device for sampling said D.C. voltage during off periods of transmission to obtain a unitary voltage indicative of said relative velocity.

4. Apparatus for determining the relative velocity between a body and a fluid medium comprising in combination: input signal means for providing a modulated carrier input signal having alternating on and off periods of transmission; first and second transducer means associated with said body and disposed in said fluid medium and responsive to said input signal to provide respectively first and second acoustic signals along substantially identical paths in said fluid medium, said first transducer means responsive to said second acoustic signal to provide a first output signal, said second transducer means responsive to said first acoustic signal to provide a second output signal, said output signals having a lower power level that said input signal and occurring during an off period of transmission; switching means having two modes of operation; receiver means responsive, when said switching means is in a first mode of operation, to said input signal and said first and second output signals and biased such that only said lower power level first and second output signals will produce first and second demodulated signals, said receiver means responsive, when said switching means is in a second mode of operation, to said input signal and said second output signal and biased such that only said lower power level second output signal will produce third and fourth demodulated signals; means for coinciding the phase of said latter signals; and phase comparison means for obtaining a unitary signal indicative of the phase difference between said first and second or said third and fourth demodulated signals.

5. Apparatus for determining the velocity of a body traveling in a fluid medium, comprising in combination: input signal means for providing an amplitude modulated carrier input signal having alternating on and off periods of transmission; first and second transducer means associated with said body and disposed in said fluid medium at a determined distance from one another and responsive to said input signal to provide respectively first and second acoustic signals along substantially identical paths in said fluid medium, said first transducer means responsive to said second acoustic signal to provide a first output signal, said second transducer means responsive to said first acoustic signal to provide a second output signal, said output signals having a lower power level than said input signals, said predetermined distance being such that said first and second acoustic signals reach said second and first transducer means during an off period of transmission; switching means having two modes of operations; receiver means responsive, when said switching means is in a first mode of operation, to said input signal and said first and second output signals and biased such that only said lower power level first and second output signals will produce first and second demodulated signals, said receiver means responsive, when said switching means is in a second mode of operation to said input signal and said second output signal and biased such that only said lower power level second output signal will produce third and fourth demodulated signals; means for coinciding the phase of said latter signals; means including a phasemeter for obtaining a D.C. signal during off periods of transmission indicative of the phase difference between said first and second or said third and fourth demodulating signals; and means for storing the D.C. signals produced during the off periods of transmission to obtain a continuous output signal indicative of said velocity.

6. Apparatus for determining the relative velocity between a body and a fluid medium comprising in combination: input signal means including a source of carrier frequency, a source of modulation frequency and gating means for obtaining an input modulated carrier signal having an on period, and an off period of transmission; a pair of transducers mounted on said body and disposed relative to said fluid medium such that each transducer of said pair transmits an acoustic signal to the other of said pair during an on period of transmission, said acoustic signals being produced by application of said input signal, said transducers responsive to the acoustic signals produced, to provide respectively, a first and second output signals during an off period of transmission; receiver means; switching means operable in a first mode of operation for connecting said input signal and said first and second output signals to said receiver means, said receiver means biased such that it is overdriven upon application of said input signal during an on period of transmission, and will produce first and second demodulated signals upon application of said first and second output siganls during an off period of transmission, said first and second demodulated signals differing in phase by an amount proportional to said relative velocity; said switching means additionally operable in a second mode of operation to connect said input signal and only one of said first or second output signals to said receiver means, the application of the latter signal producing third and fourth demodulated signals; phase shifting means for coinciding the phase of said third and fourth demodulated signals; and phase comparison means for comparing any phase difference between said first and second and said third and fourth demodulated signals.

7. In an acoustic flowmeter operable with at least first and second transducer means for transmitting acoustic signals to and from one another through a fluid medium to obtain at least first and second output signals indicative of the relative velocity of the fluid medium, in combination: switching means operable in a first and second mode of operation; receiver means responsive, when said switching means is in a first mode of operation, to said output signals for producing first and second comparison signals; said switching means operable when in said second mode of operation to apply only one of said output signals to said receiver means to produce third and fourth comparison signals; the phase difference between said first and second comparison signals being caused by said relative velocity; the phase difference between said third and fourth comparison signals being caused by inherent delays in said flowmeter; phase shifting means for coinciding the phase of said third and fourth comparison signals; and means for comparing said first and second and said third and fourth comparison signals.

References Cited by the Examiner
UNITED STATES PATENTS 2,991,650    7/61    Katzenstein et al. _____ 73—194
3,050,997    8/62    Lake _____ 73—194

OTHER REFERENCES

Robert C. McMaster, editor: Nondestructive testing Handbook, vol. II, The Rondal Press Company, New York, N.Y. 1959, pages 47–29 relied on.

RICHARD C. QUEISSER, *Primary Examiner.*